March 15, 1966 L. L. SHAFFER ETAL 3,239,909
STRIP JOINT SPACER AND WELDER ASSEMBLY
Filed Aug. 2, 1963 3 Sheets-Sheet 1
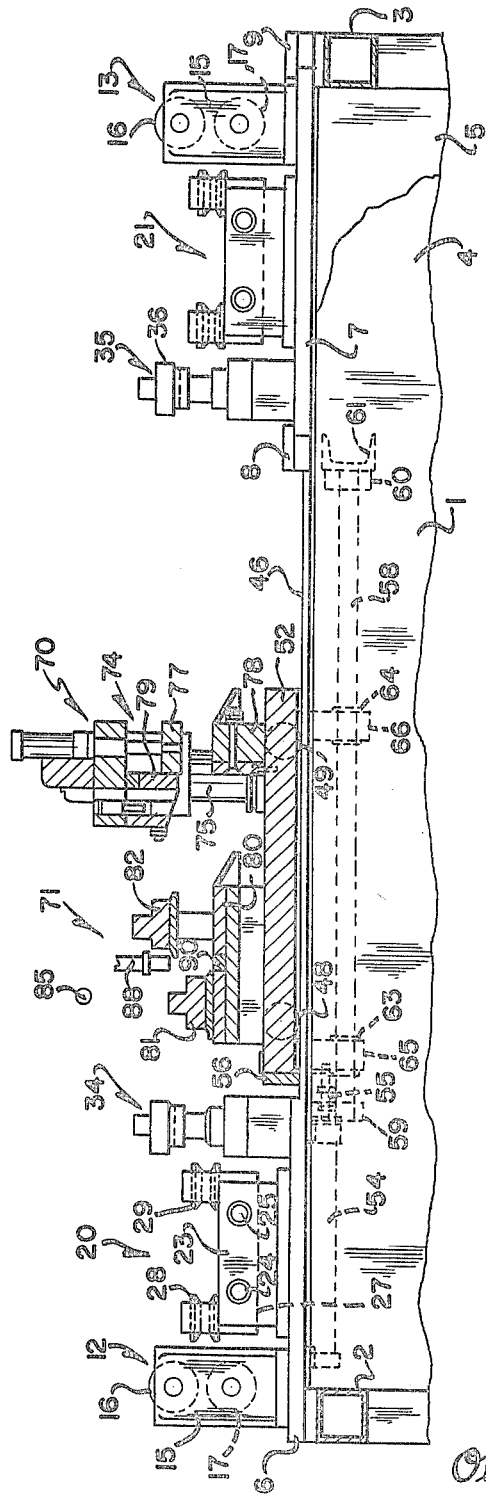
FIG_1
INVENTORS
LEON L. SHAFFER &
DONALD J. WHEELER
BY
Oberlin, Maky & Donnelly
ATTORNEYS

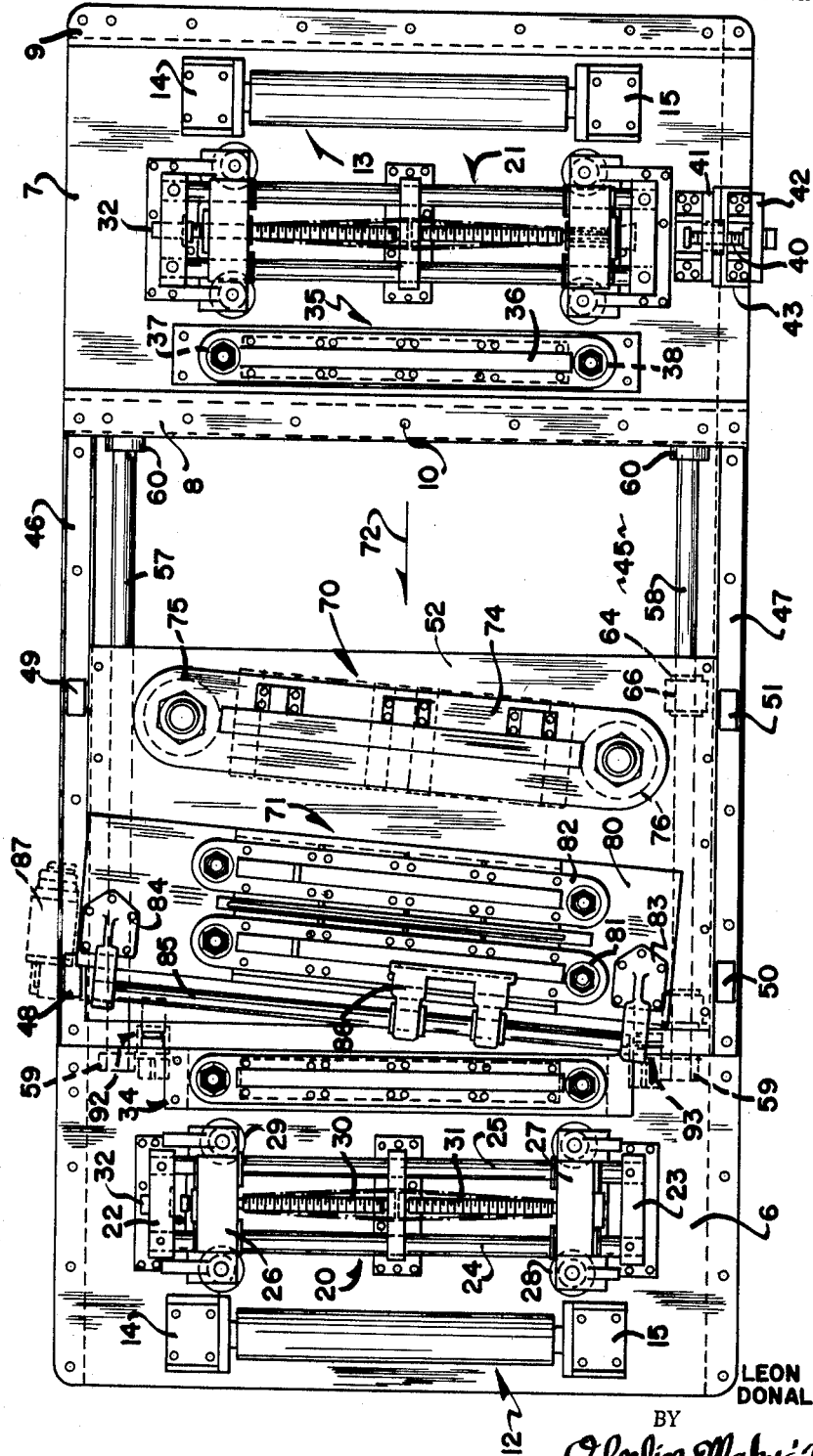

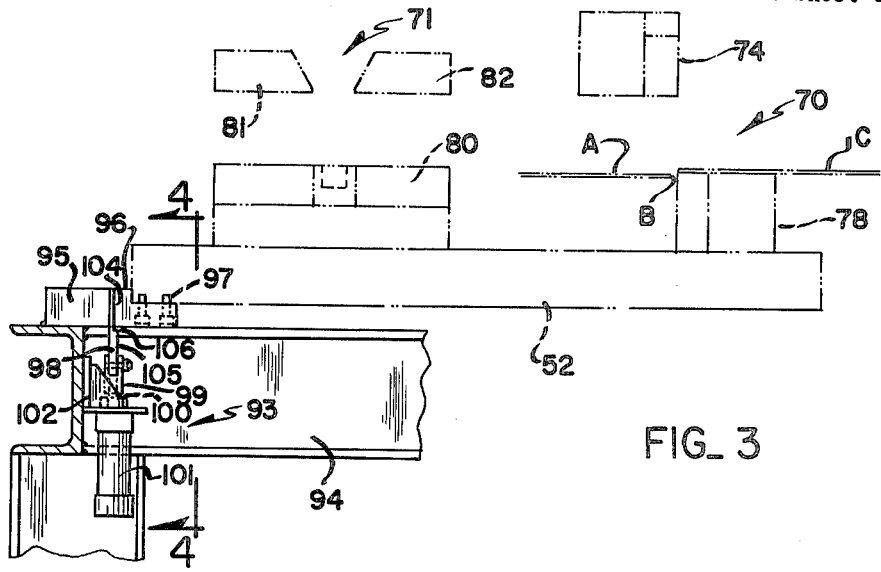
FIG_3
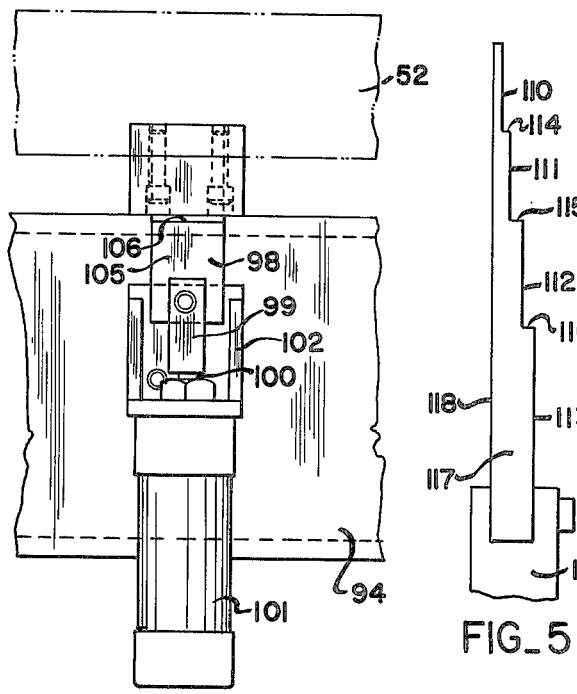
FIG_4
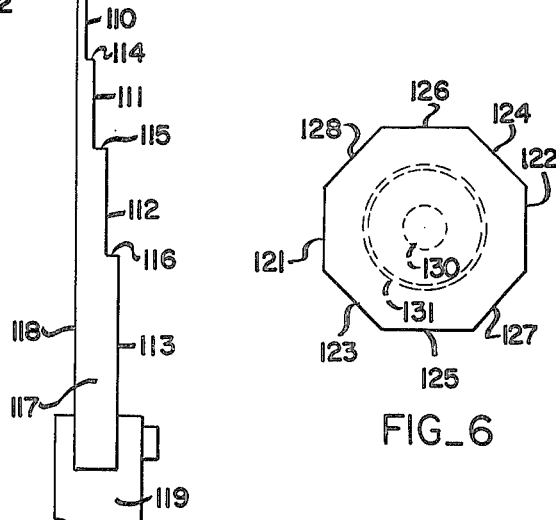
FIG_5
FIG_6

United States Patent Office 3,239,909
Patented Mar. 15, 1966

3,239,909
STRIP JOINT SPACER AND WELDER ASSEMBLY
Leon L. Shaffer and Donald J. Wheeler, Kent, Ohio, assignors to Guild Metal Joining Equipment Co., Bedford, Ohio, a corporation of Ohio
Filed Aug. 2, 1963, Ser. No. 299,569
15 Claims. (Cl. 29—33)

This invention relates generally, as indicated, to a strip joint spacer and welder assembly and more particularly to a metal strip joining machine for continuous strip processing lines.

In forming lines such as tube mills, four-high mills, or slitting lines, continuous metal strip is contacted by forming rolls, pinch rolls, and other metal working equipment. Similarly, in processing lines such as pickling, cleaning, or annealing lines, the continuous metal strip requires to pass through pinch rolls, brushes, and other strip contacting apparatus and any irregularities in the continuous strip may cause severe damage to such equipment. For such a mill or line to operate continuously, the leading end of a metal strip must be joined to the trailing end of a previous metal strip accurately in an expeditious manner with a joint of sufficient strength which will not in any way damage the equipment in the line such as subsequent rolling, forming, or cut-off apparatus.

In joining such strip by welding, it is necessary to obtain an accurate gap or spacing between the leading and trailing edges of the metal strip. On heavier gauge strip, it is necessary to space the butted strip ends at varying distances apart to obtain a strip weld or splice with sufficient penetration through the inner faces of the strip ends to give a weld of sufficient high quality. Needless to say, the spacing of the strip ends can affect the thickness of the weld joint so that the spacing of the strip is a factor in obtaining a weld joint which is substantially the same thickness as the parent metal strips.

It is accordingly a principal object of the present invention to provide a strip joining machine which will expeditiously produce a joint of the required strength of substantially the same thickness as the strip to be joined.

A further principal object is the provision of a strip joining machine comprising a shear and end welder which will accurately space and position the inner end faces of the ends of metal to be joined.

Another object is to provide a shear and end welder for continuous processing lines which will quickly and expeditiously automatically produce a weld joint having 100% penetration in the fused area without increasing the thickness of the continuous strip thus formed.

A further object is the provision of a unique gap control device for shear and end welders for continuous processing lines.

A still further object is the provision of a gap control mechanism for shear and end welders which will not directly contact the strip to be spaced and joined.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

FIG. 1 is a fragmentary side elevation partially broken away and in section of a metal strip joining machine in accordance with the present invention;

FIG. 2 is a top plan view of such machine;

FIG. 3 is a fragmentary detail view of the gap control mechanism with the index table and the weld and shear units mounted thereon shown schematically;

FIG. 4 is an enlarged detail view of the gap control mechanism as seen from the line 4—4 of FIG. 3;

FIG. 5 is an enlarged end elevation of a slightly modified gap control blade; and FIG. 6 is an enlarged top plan view of an alternative gap control mechanism.

Referring now to the annexed drawings and more particularly to FIGS. 1 and 2, the machine illustrated comprises a stand 1 which includes square section tubular framing 2 and 3 at each end thereof. The stand 1 may include cover or appearance side plates 4 and 5 and supports on the top thereof at one end a fixed end plate 6. The opposite end of the stand supports a laterally movable support plate 7 supported between laterally extending gibs 8 and 9 which may be secured to the top stand by suitable fasteners 10 such as recessed head cap screws. Both the fixed plate 6 and the laterally adjustable plate 7 support at their outer ends roll stands 12 and 13, respectively, which may be identical in form. Each roll stand comprises upstanding brackets 14 and 15 between which are journalled strip contacting rolls 16 and 17.

Inwardly spaced from the roll stands 12 and 13 on the fixed end movable plates 6 and 7 there are provided self-centering guide roll units 20 and 21, respectively, each of which may be identical in form. Each such unit comprises support stands 22 and 23 between which are secured laterally extending guide rods 24 and 25. Roll supports 26 and 27 are mounted on such guide rods at the opposite ends thereof for movement therealong and each such roll support is provided with two grooved strip edge contacting rollers 28 and 29. The lateral spacing of the roll supports 26 and 27 and thus the pairs of edge contacting rolls supported thereby may be varied by means of adjusting screws 30 and 31 threaded within nuts within the roll supports. Such screws may be turned simultaneously by a suitable tool applied at 32. The rolls 28 and 29 may thus be brought into contact with the edge of a strip passing therethrough, but the entire unit may be free to move along the guide rods 24 and 25 to compensate for camber in the strip.

Inwardly adjacent the self-centering guide roll units 20 and 21 on the fixed and laterally adjustable plates 6 and 7, respectively, there are provided strip clamp units 34 and 35, respectively. Each such clamp unit may be of a conventional variety comprising a vertically movable head 36 mounted on posts 37 and 38 moved downwardly by suitable strip clamping piston-cylinder assemblies to move the top clamp member held by the head against the strip to clamp the strip to a platen therebeneath.

It will now be seen that the roll stands, self-centering edge roll units, and strip clamps at the entry and exit ends of the machine are arranged in inverse order, the entry end of the machine being to the right in FIGS 1 and 2, while the exit end is to the left. Otherwise, the apparatus so far described at the entry and exit ends is the same with the exception that the apparatus at the entry end is mounted on the laterally adjustable plate 7. This lateral adjustability of the plate 7 may be obtained by adjusting screw 40 extending between brackets 41 and 42 secured to the plate 7 and stand 1, respectively, with the plate 7 being cut away as indicated at 43 to accommodate the bracket 42. (See FIG. 2.) This adjustability feature permits the operator to cross index or laterally adjust the entire entry end of the machine to correct edge misalignment which may occur as the result of camber in the strip.

Between the fixed plate 6 and the gib 8, there is provided a well 45 having at the sides thereof runners 46 and 47 which support index table rollers 48, 49 and 50, 51, respectively. Such rollers project from the sides of index table 52 and support such table for movement back and forth along the side runners 46 and 47 over the top of well 45. Such movement is obtained by piston-cylinder assembly 54 secured to the bottom of fixed plate 6. The rod 55 of such piston-cylinder assembly is secured to bracket 56 on one end of the index table and reciprocation of the rod will cause reciprocation of the index table 52.

Two alignment shafts 57 and 58 extend through the well 45 just below the index table 52 between respective shaft housing blocks 59 and 60 secured beneath the fixed plate 6 and transverse frame member 61. Each shaft extends through ball bushings 63 and 64 mounted in ball bushing housings 65 and 66, respectively, mounted on the underside of the index table 52. In this manner, the index table 52 is supported for reciprocation by the rolls 48 through 51 while accurately guided in such movement by the alignment shafts and ball bushings thereon.

Mounted on the index table 52 is a shear unit 70 and a weld unit 71 for indexing movement therewith. Such shear and weld units extend transversely of the strip slightly biased thereto to produce a weld joint in the continuous strip which will also be slightly biased with respect to the longitudinal axis of the strip indicated by the arrow 72 in FIG. 1. The shear unit 70 may be of conventional variety and includes a head 74 mounted for vertical movement on posts 75 and 76. When the posts move downwardly bringing the head 74 downwardly, spring loaded clamping plate 77 will clamp the strip against platen 78 with blade 79 continuing downwardly to shear the strip therein.

The weld unit 71 comprises a platen 80 and strip end clamps 81 and 82, the clamp 82 being shown elevated in FIG. 1. Brackets 83 and 84 at each end of the elevated or raised platen or platform 80 support vertically spaced guide rods 85 extending therebetween parallel to the clamps 81 and 82. Mounted on such guide rods 85 is a weld carriage support bracket 86 which may be moved therealong by a ball nut drive driven by variable speed motor 87. The weld carriage 86 supports a vertically extending torch 88 (not shown in FIG. 2, see FIG. 1). The torch may be mounted on an air slide automatically to elevate at the end of a weld traverse permitting the machine to be reset immediately. Also, vertical and angular torch adjustment may be provided. The weld unit 71 is generally conventional and accordingly many of the details of such weld unit have not been shown for clarity of illustration. With the strip ends clamped in place, the torch may readily be traversed between the strip clamps 81 and 82 welding the thus held strip ends together. A backup 90 is provided in the platen 80 between the clamps 81 and 82 and the weld material will fill the gap between the sheared ends of the strip thus clamped for welding.

It will, of course, be understood that various types of welding may be employed such as a metallic arc using a consumable electrode, a tungsten arc using a non-consumable electrode, or a tungsten arc using side wire feed. In any event, the welding unit per se forms no part of the present invention.

Referring now additionally to FIGS. 3 and 4, gap control mechanisms 92 and 93 are provided at the left-hand side of the index table 52. Each control device may be identical in form and accordingly only gap control device 93 will be illustrated and described in detail. The stand top frame 94 has provided on the top thereof at each side a gap block 95 opposed to index blocks 96 secured to the index table as indicated by the fasteners 97. The gauging mechanisms at each side of the index table each include a gap blade 98 mounted in yokes 99 secured to the rods 100 of piston-cylinder assemblies 101. Such piston-cylinder assemblies may be mounted on brackets 102 secured to the top frame 94 of the stand 1. As seen in FIG. 3, each gap blade 98 is provided with two gauging surfaces 104 and 105 with a shoulder 106 therebetween. The surface of the blade opposite the shoulder 106 is vertically planar and accordingly the shoulder 106 forms blade portions of different thickness. The gauge surface 104 may be referred to as the minor surface, while the surface 105 may be referred to as the major surface.

It can now be seen that as the index table 52 is moved to the left, it will be physically stopped by the gap blade surface interposed between the blocks 95 and 96. It will move farther to the left if the thinner or minor surface 104 is interposed as shown in FIG. 3 than if the major surface 105 is interposed between the blocks 95 and 96. Extension of the piston-cylinder assembly 101 will raise the blade 98 to interpose the surface 105 between the blocks when desired.

In FIG. 5, there is shown a slightly modified gap gauging blade having gauging surfaces 110, 111, 112 and 113 formed by steps 114, 115 and 116 in one side only of the blade 117 with the opposite side 118 being vertically planar. Such blade may be mounted in yoke 119 secured to the rod of a piston-cylinder assembly in the same manner as shown in FIG. 3 so that the blade may be vertically moved to interpose the selected gauging surface and thus the selected blade thickness between the blocks 95 and 96.

In FIG. 6 there is shown an alternative form of gap gauging mechanism which comprises a flatted cylinder illustrated as octagonal in section, in which the sets of flats 121, 122, 123, 124, 125, 126 and 127, 128, on diametrically opposite sides of the cylinder are each a different distance apart to obtain the proper pre-weld gaps necessary for joining different thicknesses of stock. Such multi-sided stop cylinder or spacer block may be mounted for vertical movement on the rod 130 of a piston-cylinder assembly or like actuator and a dial 131 may be provided to enable the operator readily to rotate the cylinder to select the proper gap thickness.

*Operation*

With reference particularly to FIG. 3, the operation of the device will now be set forth. The trailing end of a previous coil of stock A is clamped by the strip clamp 34, the end protruding through the welding unit and at least partially through the shear 70. The index table 52 is moved to the left by piston-cylinder assembly 54 with the blocks 96 engaging the minor surface 104 of the blade 98. The shear 70 now operates producing a straight, clean edge in preparation for the welding or brazing operation and also operates a switch causing the piston-cylinder 54 to extend slightly moving the index table 52 a short distance to the right and also causing piston-cylinder assembly 101 to extend raising the gauging plate 98 to present the thicker portion or major surface 105 to be contacted by the index table block 96.

The piston-cylinder assembly 54 is now retracted returning the index table to the left as seen in FIG. 3 against the major surface 105 of the stop gauge plate 98. It is now apparent that the index table 52 is spaced to the right from its original position a distance equal to the difference in the thicknesses afforded by the minor and major surfaces 104 and 105 of the stop gauge plate 98. The shear unit 70 will now be spaced to the right of the trimmed end B of the trailing end of the previous coil of stock A a distance equal to the difference in spacing of the index table 52.

A new coil of stock is now fed into the machine through the entry end roll stand 13, the self-centering guide 21 and through the clamp 35 with the leading edge thereof projecting slightly through the shear unit 70 now slightly repositioned. When the leading end C projects properly into the shear unit, the operator will actuate clamp 35 clamping the leading end to the machine. The operator will now adjust the screw 40 to bring the edges of the strip into correct alignment. The shear unit 70 now makes a trim cut on the leading end of the new coil of stock C which has thus been positioned and clamped in place. Because of the new position of the index table 52 for the second trim cut on the stock C, there is now a gap between the trimmed trailing end of the previous coil of stock A and the trimmed leading end of the new coil of stock C, and this gap is equal to the difference in thickness between the major and minor gauge plate thicknesses against which the index table is positioned during successive shear operations.

While the strips A and C are still clamped in position in the machine by the clamps 34 and 35, respectively, the piston-cylinder assembly 54 is now extended indexing the table 52 from the "shear" to the "weld" position. The weld unit 71 will now move to the right assuming the position of the shear unit with the clamped, gapped stock ends being positioned directly over the insert 90 in the weld platen 80. The weld clamps 81 and 82 are now brought down properly to clamp the trimmed ends of the stock in position for welding. The welding unit support bracket 86 is now traversed across the strip with the torch 88 joining the strip ends held by the welding clamps. Because of the very accurately controlled gap, the weld is made on the inner face of pre-sheared ends and the joint will be of substantially the same thickness as the parent materials. It will, of course, be understood that a festoon unit may be employed in connection with a joining machine illustrated to permit the mill or line to operate continuously. As an alternative, a gauging blade having a uniform thickness may be employed with the thickness of the blade being equal to the gap desired between the sheared strip ends. The stop blocks 95 and 96 can then be butted together to achieve the first position of the index table 52 and the uniform thickness blade may then simply be raised into position betwen the blocks to achieve the second shear position of the table.

With the gauging mechanisms illustrated in FIGS. 5 and 6, the operator may select gaps of different widths which may be desirable in joining different thicknesses of stock. The extent of movement of the piston-cylinder assembly supporting the blade 117 will cause the selected blade thickness to be interposed between the blocks 95 and and 96 thus achieving the desired gap thickness. The operator may rotate the faceted cylinder shown in FIG. 6 by means of the dial 131 again to select the desired gap width. Indicating lights may be provided to show the operator which thickness of stock and thus the gap thickness that the machine is set up for.

It can now be seen that the actual gauging mechanism in no way contacts the strip and the various thicknesses of the gauging blade can be very accurately maintained to obtain a very accurate strip gap. Accordingly, there is produced a strip joining machine expeditiously producing a high quality weld joint between the trailing and leading ends of strip stock. The joint produced will be substantially the same thickness as the stock avoiding any damage to equipment of subsequent rolling, forming and/or cut-off operations.

Other modes of applying the principle of the invention may be employed, change being made as regards the details described, provided the features stated in any of the following claims or the equivalent of such be employed.

We, therefore, particularly point out and distinctly claim as our invention:

1. A machine for joining metal strip comprising a stand, trailing end strip clamp means operative to clamp the trailing end of strip stock on said stand, leading end strip clamp means operative to clamp the leading end of strip stock on said stand, an index table, means mounting said index table for horizontal movement on said stand between said strip clamp means, horizontally spaced weld and shear units mounted on said table, gap gauging means limiting movement of said table operative to shift said shear unit when trimming such leading end strip stock after having trimmed such trailing end strip stock to space such trimmed ends a predetermined distance, and means to shift said index table to place said weld unit over the thus trimmed and spaced strip stock ends to join such strip.

2. A machine as set forth in claim 1 including opposed stop blocks on said stand and table, respectively, said gap gauging means comprising a blade of predetermined thickness, and means operative to insert said blade between said blocks to change the position of said table when said blocks are moved together.

3. A machine as set forth in claim 1 wherein said means to insert said blade comprises a piston-cylinder assembly.

4. A machine as set forth in claim 1 wherein said gap gauging means comprises a multi-faceted cylinder having facets of different radial spacing, and means to rotate said cylinder to present different facets to said index table, said shear unit being shifted by holding said table first against one facet and then against another after said cylinder has been rotated.

5. A machine as set forth in claim 4 including means axially to shift said cylinder.

6. A machine as set forth in claim 1 wherein said gap gauging means comprises a stop member of predetermined thickness, and means to shift said stop member into position to engage said table after said shear unit has trimmed such trailing end strip stock.

7. A machine as set forth in claim 1 wherein said gap gauging means comprises a stop member having at least two vertically offset index table engaging faces, and means vertically to move said stop member, said shear unit being shifted by holding said table first against one face and then against the other after said stop member has been vertically shifted.

8. In combination, a shear and weld unit for joining metal strip stock for continuous strip processing lines and the like, means operative to orient and hold two strip ends to be joined with respect to said shear, means operative accurately to shift the position of said shear after severing one of said strip ends and before severing the other thus to control the spacing between such sheared ends, and means relatively to index said weld unit and such sheared ends to position the same for weld joining such strip ends.

9. The combination set forth in claim 8 wherein said shear and weld units are mounted on a table, means operative to move said table thus to index said weld unit, and means engaging said table operative to control the shifting of said shear to control the spacing of such sheared ends.

10. The combination set forth in claim 9 wherein said means engaging said table comprises an adjustable stop limiting movement of said table in one direction.

11. The combination set forth in claim 10 including a fixed stop for said table, and means mounting said adjustable stop for interposition between said fixed stop and said table.

12. The combination set forth in claim 11 wherein said adjustable stop has a planar side adapted to engage said fixed stop and a stepped side adapted to engage said table, said stepped side providing said adjustable stop with portions of different thickness.

13. The combination set forth in claim 12 wherein the extent of interposition of said adjustable stop between said fixed stop and said table controls the spacing of such sheared ends.

14. The combination set forth in claim 13 wherein said adjustable stop is mounted on a piston-cylinder assembly for interposition between said fixed stop and said table.

15. In a combination shear and end welder for metal strip stock for continuous processing lines, means operative to orient and hold two strip ends to be joined with respect to said shear, means operative to shift the position of said shear after severing one of said strip ends and before severing the other to create a gap between such sheared strip ends, and means precisely to limit such shifting of said shear accurately to control the width of such gap.

References Cited by the Examiner
UNITED STATES PATENTS 3,057,056  10/1962  Foley _____ 29—33.21

RICHARD H. EANES, Jr., *Primary Examiner.*